(12) United States Patent
Tunza

(10) Patent No.: US 7,850,134 B2
(45) Date of Patent: Dec. 14, 2010

(54) MAGNET HOLDER

(75) Inventor: Axel Tunza, Penzberg (DE)

(73) Assignee: Tunze Aquarientechnik GmbH, Penzberg (DE)

( * ) Notice: Subject to any disclaimer, the term of this patent is extended or adjusted under 35 U.S.C. 154(b) by 397 days.

(21) Appl. No.: 11/355,628

(22) Filed: Feb. 16, 2006

(65) Prior Publication Data
US 2006/0192062 A1 Aug. 31, 2006

(30) Foreign Application Priority Data
Feb. 28, 2005 (DE) .................. 20 2005 003 170 U

(51) Int. Cl.
*A47G 1/17* (2006.01)
(52) U.S. Cl. .............. 248/206.5; 248/205.1; 248/205.9; 119/230
(58) Field of Classification Search ............. 248/206.5, 248/205.1, 205.9; 119/230, 264
See application file for complete search history.

(56) References Cited

U.S. PATENT DOCUMENTS

| | | | | |
|---|---|---|---|---|
| 2,642,248 A * | 6/1953 | Semon | ................... | 248/205.9 |
| 3,178,730 A * | 4/1965 | Bogar | ................... | 261/122.1 |
| 3,239,178 A * | 3/1966 | Pompa | ................... | 248/205.3 |
| 3,365,684 A * | 1/1968 | Stemke et al. | ................ | 335/302 |
| 3,518,884 A * | 7/1970 | Wood, Jr. | ................... | 374/189 |
| 5,028,223 A * | 7/1991 | Ameter | ................... | 425/12 |
| 5,067,059 A * | 11/1991 | Hwang | ................... | 362/101 |
| 5,473,963 A * | 12/1995 | Aeschbach | ................. | 74/594.6 |
| 5,778,824 A * | 7/1998 | Musgrave et al. | ........... | 119/230 |
| 6,182,940 B1 * | 2/2001 | Miyamoto et al. | .......... | 248/682 |
| 6,206,978 B1 * | 3/2001 | Tsui | ................... | 134/8 |
| 6,749,165 B2 * | 6/2004 | Immerman | ................... | 248/304 |
| 6,886,793 B2 * | 5/2005 | Snell | ................... | 248/309.1 |
| 7,229,210 B2 * | 6/2007 | Yim | ................... | 374/208 |
| 7,506,612 B2 * | 3/2009 | Enoch et al. | ................ | 119/264 |
| 7,699,277 B2 * | 4/2010 | Bagnall | ................... | 248/206.5 |

* cited by examiner

Primary Examiner—Anita M King
(74) Attorney, Agent, or Firm—Young Basile

(57) ABSTRACT

A magnet-holder for attaching an object to a glass pane has two parts of a holder which can be placed on mutually opposed boundary faces of said glass pane and are biased towards one another by a magnetic-force apparatus. In addition, that part of the holder which is disposed on the inner side of the glass pane has a contact plate whose side that faces towards the glass pane carries a plurality of elastic holding cups which can cling to the pane.

26 Claims, 4 Drawing Sheets

MAGNET HOLDER

BACKGROUND OF THE INVENTION

The invention relates to a holder for attaching an object to a smooth pane.

Holders of this kind, which serve to attach accessories to the panes of an aquarium, are obtainable on the market. They comprise a mounting plate which is provided with mechanical fastening means to which an appliance can be attached, for example by hooking in or screwing on. For its part, the base plate carries a plurality of permanent magnets which cooperate with a holding plate which is manufactured from magnetically conducting material and is fitted on the outside of the glass pane.

In this way, the mounting plate and holding plate are pressed, by magnetic forces, against the mutually opposed surfaces of the glass pane. As a result of a frictional-contact connection between the cooperating surfaces of the mounting plate and glass pane, and the glass pane and holding plate, the holder is then seated firmly on the glass pane of the aquarium, even under the effect of the weight of the load which is being carried.

In the known magnet-holders, however, firm seating of this kind is often achieved only if the pane of the aquarium is clean and the parts of the holder are placed on said pane when the latter is dry.

For some applications, it would be advantageous if it were possible to put a magnet-holder of this kind on the pane even when the latter is dirty or when water is present, it being necessary to also guarantee non-displaceable seating of the holder on the pane.

SUMMARY OF THE INVENTION

For the purpose of achieving this object, the invention indicates a holder for attaching objects to a smooth pane, the holder has a first part which is provided with fastening means for attaching an object; and carries a first part of a magnetic-force apparatus which can be applied to the first surface of the glass pane. The holder has a second part which carries a second part of the magnetic-force apparatus and can be applied to a second side of the pane wherein the holder has a plurality of elastically deformable holding cups on it side that faces towards the pane.

In the case of the holder according to the invention, two contributions to the holding force are obtained: on the one hand, the magnetic contributions and, on the other, the contributions of small holding cups, which work like suction cups. Said suction cups have sharp edges which work their way even through contaminants located on the pane, and thus come directly into contact with the surface of the latter.

If it were desired, even in the case of a glass face which is not clean and is immersed in liquid, to obtain equally secure seating using only magnetic forces, it would be necessary to choose a very large magnet arrangement, which is disadvantageous from the aesthetic point of view. Also, the costs of such a holder and its mass would be considerably increased.

Advantageous further developments of the invention are provided. In one aspect a holder wherein the holding cups are formed onto an elastic base layer, has the advantage that even the elastic base layer can contribute to the adhesive friction between the surfaces of the pane and the two parts of the magnetic-force apparatus. In this way, still more secure seating is obtained.

The further development of the invention wherein the holding cups and, optionally, the base layer carrying the holding cups are manufactured from synthetic elastomer material, is of advantage from the point of view of good resistance to ageing and satisfactory cleaning of the elastically deformable parts of the holder.

In a holder, wherein the first and/or second part of the magnetic force apparatus has a plurality of permanent magnets which are disposed at the corners of a regular polygon, the corners of the permanent-magnet arrangement span a regular polygon. Accordingly, the holding plate which cooperates with the permanent magnets also has a geometrically simple and aesthetically attractive shape.

What is achieved by means of the further development of the invention wherein the second and/or first part of the magnetic force apparatus has strip-shaped flux-conducting arms made of magnetically conductive material, is that the two parts of the holder are particularly well protected against twisting movements. Twisting movements of this kind can occur when a pump whose axis of rotation stands perpendicularly on the face of the pane is to be attached to the latter via the holder. Pumps of this kind are often chosen in a form of construction which is adjustable in its rotational speed. The rotational speed of a pump can also change in dependence upon the load. In the case of a pump such as has been described above, however, each change in rotational speed leads to torsional moments on the holder. In the case of the holder wherein the second and/or first part of the magnetic force apparatus has strip-shaped flux conducting arms made of magnetically conductive material, twisting of the two parts of the magnetic-force apparatus in relation to one another is possible only with elevated force, since the field flux changes drastically when a twisting movement occurs.

The further developments of the invention wherein the edge contour of the flux-conducting arms is a dumbbell shape and that end sections of the flux-conducting arms and the permanent magnets have substantially identical edge geometry, are of advantage from the point of view of a further improvement in twist-proofing and a magnetic self-centering of the parts of the holder on one another.

The further development of the invention wherein the flux-conducting arms are connected via a connecting section to form a one-piece unit, is of advantage from the point of view of simple mounting and handling of the flux-conducting arms.

The further development of the invention wherein the flux-conducting arms are disposed on a transparent holding plate also promotes simple handling of the holder on attachment and removal. In addition, a larger part of the pane remains visible.

The further development of the invention wherein the holding plate is provided on the side that faces toward the panes with a contact layer having high adhesive friction and/or adhesive cups promotes a further improvement in the frictional-contact connection to the pane.

In this connection, the configuration of the layer having high adhesive friction wherein the contact layer is manufactured from transparent elastomeric material, once again, is of advantage from the point of view of an attractive exterior of the holder when mounted.

Guidance of the magnetic field which is favorable to the adhesive power is obtained by means of the measure characterized in that the side of the holding plate which lies at a distance from the panes carries a flux-conducting plate.

BRIEF DESCRIPTION OF THE DRAWINGS

The invention will be described in greater detail below with the aid of an exemplified embodiment and with reference to the drawings, in which.

DETAILED DESCRIPTION OF THE PREFERRED EMBODIMENT

Figure 1:
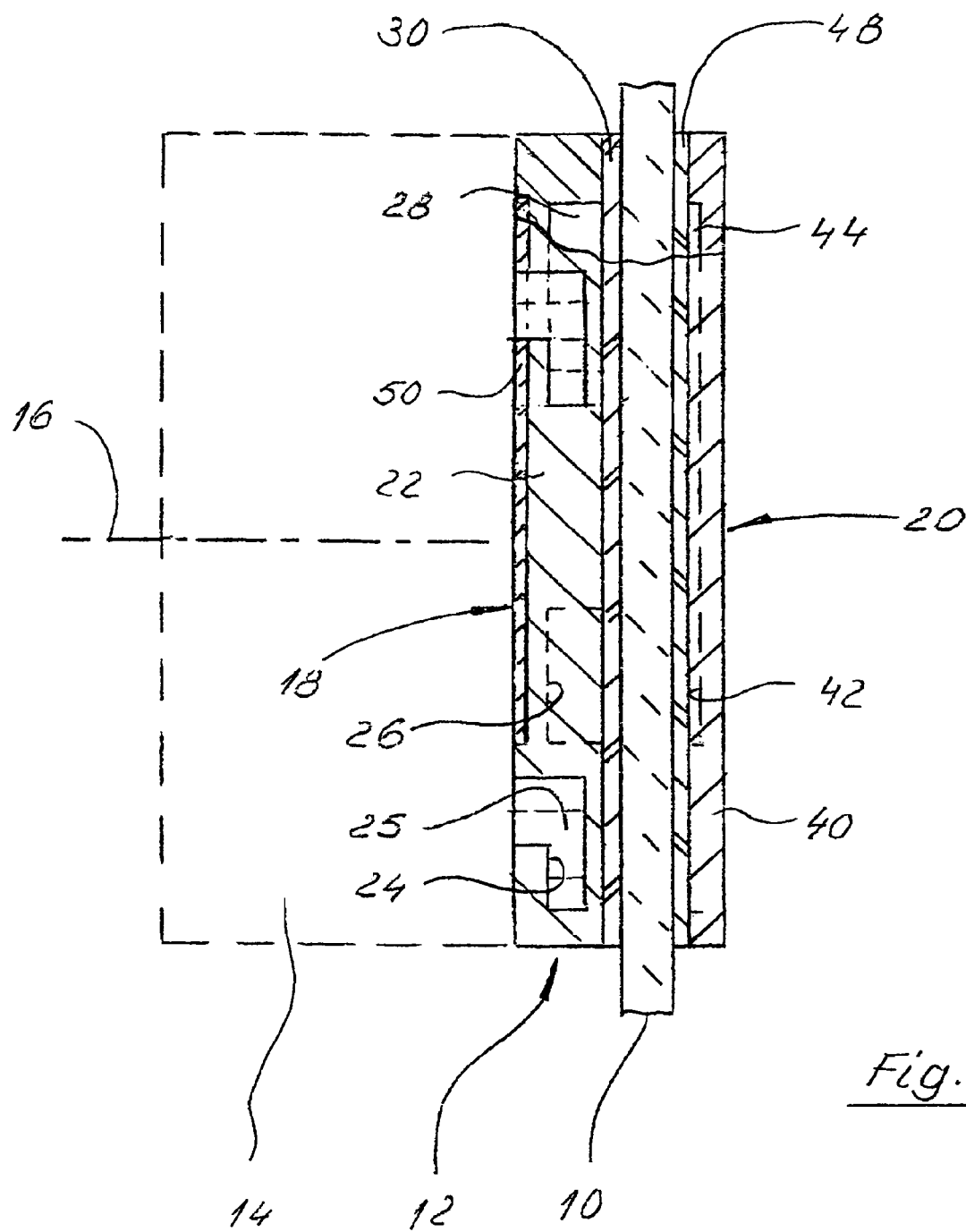
FIG. 1 shows a diagrammatic section through a glass pane of an aquarium, and a holder, which is attached to said pane, for a circulating pump.

A glass pane which forms the rear wall of an aquarium (or even a side wall or front wall) is shown at 10 in FIG. 1. The water in the aquarium is to be imagined as being on the left of the glass pane 10.

Attached to the glass pane 10 via a magnet-holder, which is designated as a whole by 12, is a pump 14 which is a centrifugal pump with a horizontal axis of rotation which stands perpendicularly on the face of the glass pane 10. Said axis of rotation is indicated at 16.

The magnet-holder 12 comprises an inner holding part which is designated as a whole by 18, and an outer holding part which is designated as a whole by 20.

The inner holding part 18 comprises a mounting plate 22 which is provided with bayonet-type apertures 24 in which corresponding bayonet-type parts 25 on the pump 14 can engage and which are represented diagrammatically in FIG. 1.

The mounting plate 22 also has four receiving apertures 26, in each of which a disc-shaped permanent magnet 28 is inserted. The receiving apertures 26, and thereby the permanent magnets 28 also, are located at the corners of a square with horizontal and vertical sides.

The permanent magnets 28 are manufactured from a magnetic material containing rare earths and having high magnetization.

Figure 4:
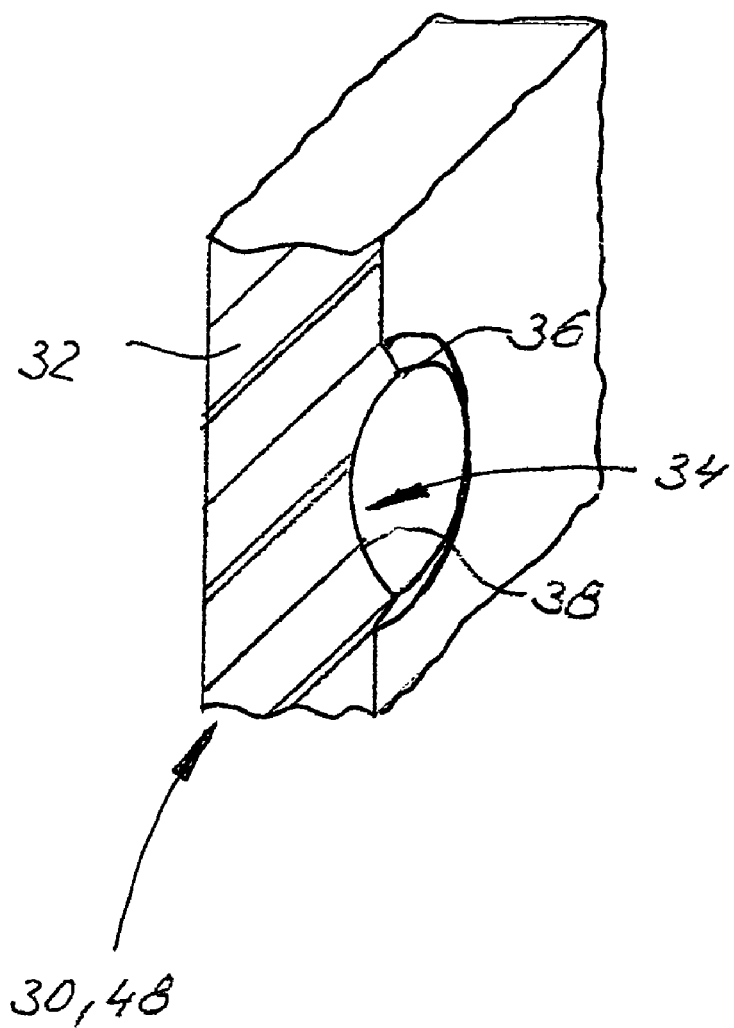
FIG. 4 shows, on an enlarged scale, a section through a holding cup on a contact plate belonging to the holder shown in FIG. 1.

On the side that faces towards the glass pane 10, the mounting plate 22 carries a contact plate 30 which is manufactured from synthetic rubber material. As can be seen in greater detail from FIG. 4, the contact plate 30 has a base layer 32 of uniform thickness onto which a plurality of holding cups 34 are formed in a manner distributed over the surface. Each of the holding cups 34 has a sharp rib 36 which projects from the base layer 32, and a cap-shaped bottom wall 38.

Figure 2:
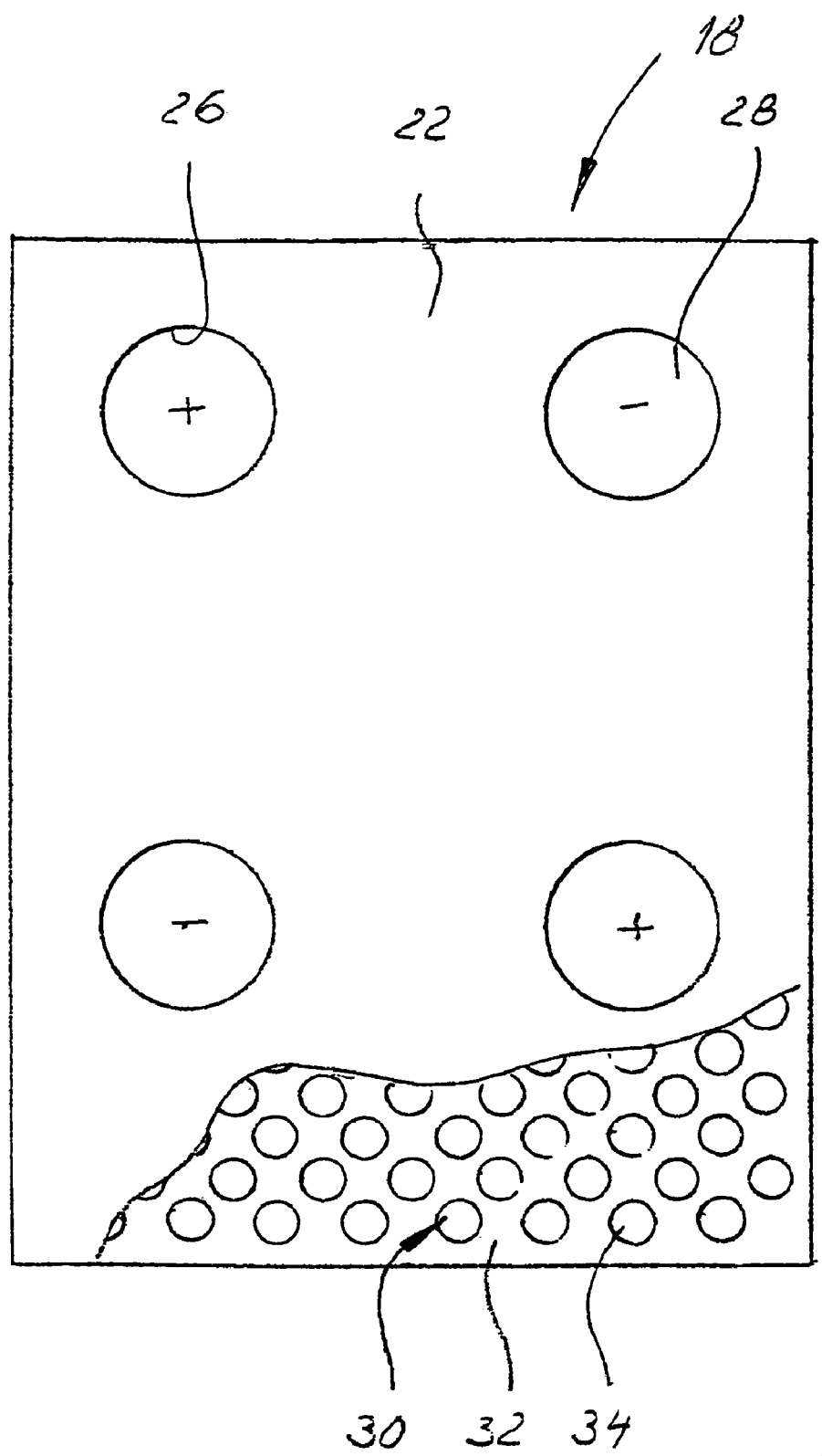
FIG. 2 shows a plan view, partly cut away, of that side of a mounting plate belonging to the holder shown in FIG. 1 which is located on the inside.
Figure 3:
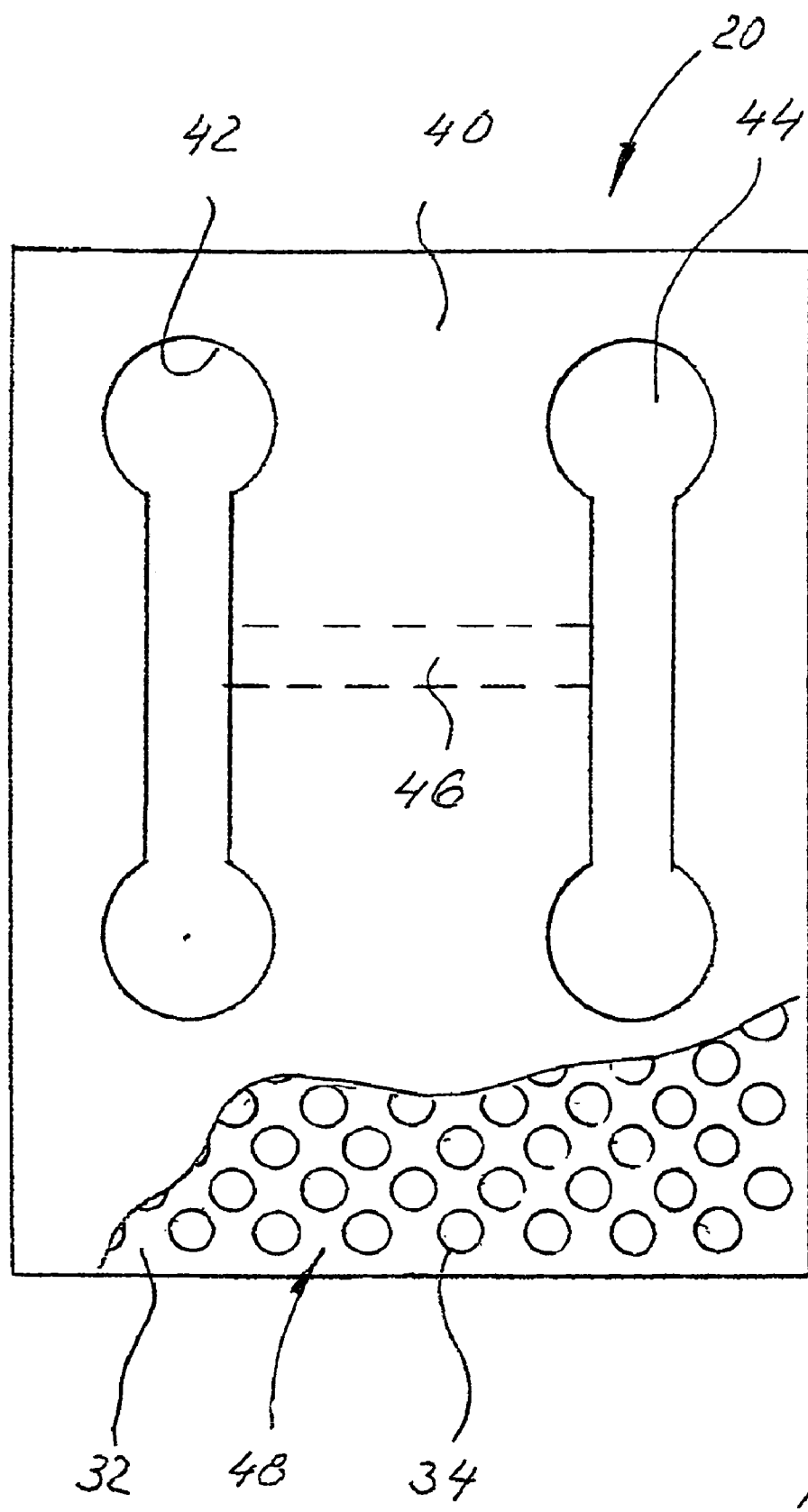
FIG. 3 shows a plan view of the inner side of an outer holding plate belonging to the holder shown in FIG. 1.

As can be seen from FIG. 2, the permanent magnets 28 are inserted in the receiving apertures 26 with successively alternating polarity.

The outer holding part 20 comprises a holding plate 40 which has shallow, dumbbell-shaped depressions 42 on the boundary face that faces towards the glass pane 10. Dumbbell-shaped flux-conducting arms 44, which are manufactured from magnetically conductive sheet-metal material, are laid in said depressions in a form-locking manner.

Alternatively, the two flux-conducting arms 44 may also be connected by a connecting web 46 to form a one-piece part.

This part may also be bonded onto the inner face of the holding plate 40, in which case corresponding clearances are then provided in a contact plate.

That boundary face of the holding plate 40 which points towards the glass pane 10 carries a contact plate 48 which is constructed in a similar manner to the contact plate 30, that is to say has holding cups 34 on a base layer 32 which point towards the glass pane.

The holder described above may be placed, in the following manner, both on a dry glass pane 10 and also on one which is immersed in liquid on one side and may possibly be contaminated by algae etc., and be slimy.

First of all, the holding part 18 is pressed firmly against the inner side of the glass pane 10 at the point at which the pump 14 is to be attached, the sharp ribs 36 of the holding cups 34 working their way through the contaminants and clinging to the surface of the pane.

The holding part 20 is then put onto the outer side of the glass pane 10 in the same region. By slight displacement, it can be sensed when the flux-conducting arms 44 are in alignment with the permanent magnets 28. A force is now exerted on the outer holding part 18 in the direction of the surface of the glass pane 10, so that the holding cups on the outer contact layer 48 also come into action.

The two holding parts 18 and 20 are now connected firmly to the glass pane 10 in an aligned position. The pump 14 can then be hooked onto the magnet-holder 12.

The invention has been described above with reference to the attachment of a pump to an aquarium wall. It goes without saying that other accessories of an aquarium can also be fastened to a pane of the aquarium, or to another pane, by means of a magnet-holder 12 in the manner described.

The side of the mounting plate 22 that faces away from the glass pane 10 may carry a metal flux-conducting sheet 50 in order to keep the stray magnetic flux small and thus increase the usable magnetic force.

What is claimed is:

1. A holder for attaching an object to a substantially smooth pane having a first surface and an opposing second surface separated from the first surface, the holder comprising: a first part having fastening means for attaching said object, the first part further carries a first part of a magnetic-force apparatus and which can be applied to the first surface of the pane; a second part having a second part of the magnetic-force apparatus and can be applied to the second opposing surface of said pane, characterized in that the first part of the holder has a plurality of elastically deformable holding cups on its side that faces towards the pane, wherein at least one of the first and the second part of the magnetic-force apparatus comprises a plurality of permanent magnets which are disposed at the corners of a regular polygon.

2. The holder according to claim 1, characterized in that the holding cups and, optionally, a base layer carrying the latter, are manufactured from a synthetic elastomer material.

3. The holder according to claim 1, characterized in that at least one of the second and the first part of the magnetic-force apparatus has strip-shaped flux-conducting arms made of magnetically conductive material.

4. The holder according to claim 3, characterized in that an edge contour of the flux-conducting arms is dumbbell-shaped.

5. The holder according to claim 3, characterized in that end sections of the flux-conducting aims and the permanent magnets have substantially identical edge geometry.

6. The holder according to claim 3, characterized in that the flux-conducting arms are connected via a connecting section to form a one-piece unit.

7. A holder for attaching an object to a substantially smooth pane having a first surface and an opposing second surface separated from the first surface, the holder comprising: a first part having fastening means for attaching said object, the first part further carries a first part of a magnetic-force apparatus and which can be applied to the first surface of the pane; a second part having a second part of the magnetic-force apparatus and can be applied to the second opposing surface of said pane, characterized in that the first part of the holder has a plurality of elastically deformable holding cups on its side that faces towards the pane, the holding cups are formed onto an elastic base layer.

8. A holder for attaching an object to a smooth pane, said holder having a first part of the holder which is provided with fastening means for attaching said object and carries a first part of a magnetic-force apparatus and which can be applied to a first surface of a glass pane, and having a second part of the holder which carries a second part of the magnetic-force apparatus and can be applied to a second side of said pane, characterized in that the first part of the holder has a plurality of elastically deformable holding cups on its side that faces towards the pane and wherein at least one of the second and the first part of the magnetic force apparatus comprises a side which lies at a distance from the pane and carries a flux-conducting plate.

9. A holder for attaching an object to a smooth pane, said holder having a first part of the holder which is provided with fastening means for attaching said object and carries a first part of a magnetic-force apparatus and which can be applied to a first surface of a glass pane, and having a second part of the holder which carries a second part of the magnetic-force apparatus and can be applied to a second side of said pane, characterized in that the first part of the holder has a plurality of elastically deformable holding cups on its side that faces towards the pane and is further characterized in that at least one of the first and the second part of the magnetic force apparatus comprises a plurality of permanent magnets which are disposed at the corners of a regular polygon, wherein at least one of the second and the first part of the magnetic-force apparatus has strip-shaped flux-conducting arms made of magnetically conductive material.

10. The holder according to claim 9, characterized in that an edge contour of the flux-conducting arms is dumbbell-shaped.

11. The holder according to claim 9, characterized in that end sections of the flux-conducting arms and the permanent magnets have substantially identical edge geometry.

12. The holder according to claim 9, characterized in that the flux-conducting arms are connected via a connecting section to form a one-piece unit.

13. The holder according to claim 9, characterized in that the flux-conducting arms are disposed on a transparent holding plate.

14. The holder according to claim 13, characterized in that the holding plate is provided, on the side that faces towards the pane, with a contact layer having high adhesive friction and/or adhesive cups.

15. The holder according to claim 14, characterized in that the contact layer is manufactured from a transparent elastomeric material.

16. The holder according to claim 9, characterized in that at least one of the second and the first part of the magnetic force apparatus comprises a side which lies at a distance from the pane and carries a flux-conducting plate.

17. A holder for use in attaching an object to a smooth pane having a first surface and an opposing second surface separated from the first surface, the holder comprising:
a magnetic force apparatus comprising a first part having at least one elastically deformable holding cup positioned adjacent to and for engagement with the pane's first surface and a second part for abutting engagement to the pane's opposing second surface in substantial alignment with the first part, wherein at least one of the first and the second part further comprises at least one permanent magnet and at least one of the other of the first and second parts comprises flux conductors positioned in substantial alignment with the respective permanent magnet which respectively forcibly attract one another through the pane.

18. The holder of claim 17 further comprising a plurality of holding cups.

19. The holder of claim 17 further comprising a plurality of magnets.

20. A holder for use in attaching an object to a smooth pane having a first surface and an opposing second surface separated from the first surface, the holder comprising:
a magnetic force apparatus comprising a first part having at least one elastically deformable holding cup positioned adjacent to and for engagement with the pane's first surface and a second part for abutting engagement to the pane's opposing second surface in substantial alignment with the first part, wherein at least one of the first and the second part further comprises a plurality of first permanent magnets and at least one of the other of the first and second parts comprises a second permanent magnet positioned in substantial alignment with at least one of the respective first permanent magnets which respectively forcibly attract one another through the pane.

21. The holder of claim 20 further comprising a plurality of holding cups.

22. A holder for attaching an object to a substantially smooth pane having a first surface and an opposing second surface separated from the first surface, the holder comprising: a first part having fastening means for attaching said object, the first part further carries a first part of a magnetic-force apparatus and which can be applied to the first surface of the pane; a second part having a second part of the magnetic-force apparatus and can be applied to the second opposing surface of said pane, characterized in that the first part of the holder has a plurality of elastically deformable holding cups on its side that faces towards the pane and wherein at least one of the first and the second part of the magnetic-force apparatus comprises a plurality of permanent magnets which are disposed at the corners of a regular polygon.

23. The holder according to claim 22, characterized in that at least one of the second and the first part of the magnetic-force apparatus has strip-shaped flux-conducting arms made of magnetically conductive material.

24. The holder according to claim 23, characterized in that an edge contour of the flux-conducting arms is dumbbell-shaped.

25. The holder according to claim 23, characterized in that end sections of the flux-conducting arms and the permanent magnets have substantially identical edge geometry.

26. The holder according to claim 23, characterized in that the flux-conducting arms are connected via a connecting section to form a one-piece unit.

* * * * *

UNITED STATES PATENT AND TRADEMARK OFFICE
CERTIFICATE OF CORRECTION

| | | |
|---|---|---|
| PATENT NO. | : 7,850,134 B2 | Page 1 of 1 |
| APPLICATION NO. | : 11/355628 | |
| DATED | : December 14, 2010 | |
| INVENTOR(S) | : Axel Tunze | |

It is certified that error appears in the above-identified patent and that said Letters Patent is hereby corrected as shown below:

Title Page, Item (12) "Tunza" should read -- Tunze --

Title Page Item (75) Inventor: Axel Tunza delete "Tunza" and insert -- Tunze --

Signed and Sealed this

Nineteenth Day of April, 2011

David J. Kappos
*Director of the United States Patent and Trademark Office*